United States Patent Office 3,350,625
Patented Oct. 31, 1967

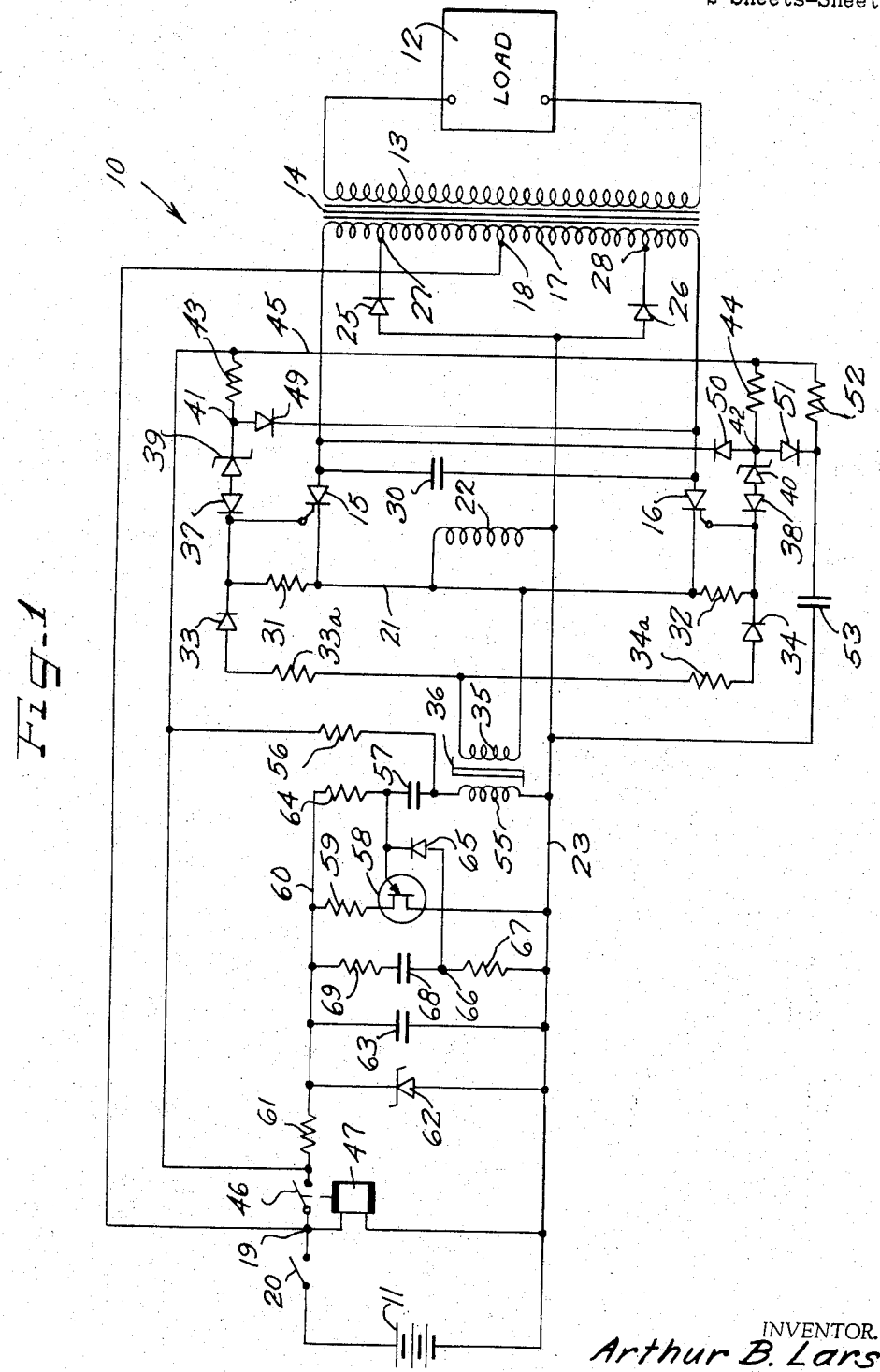

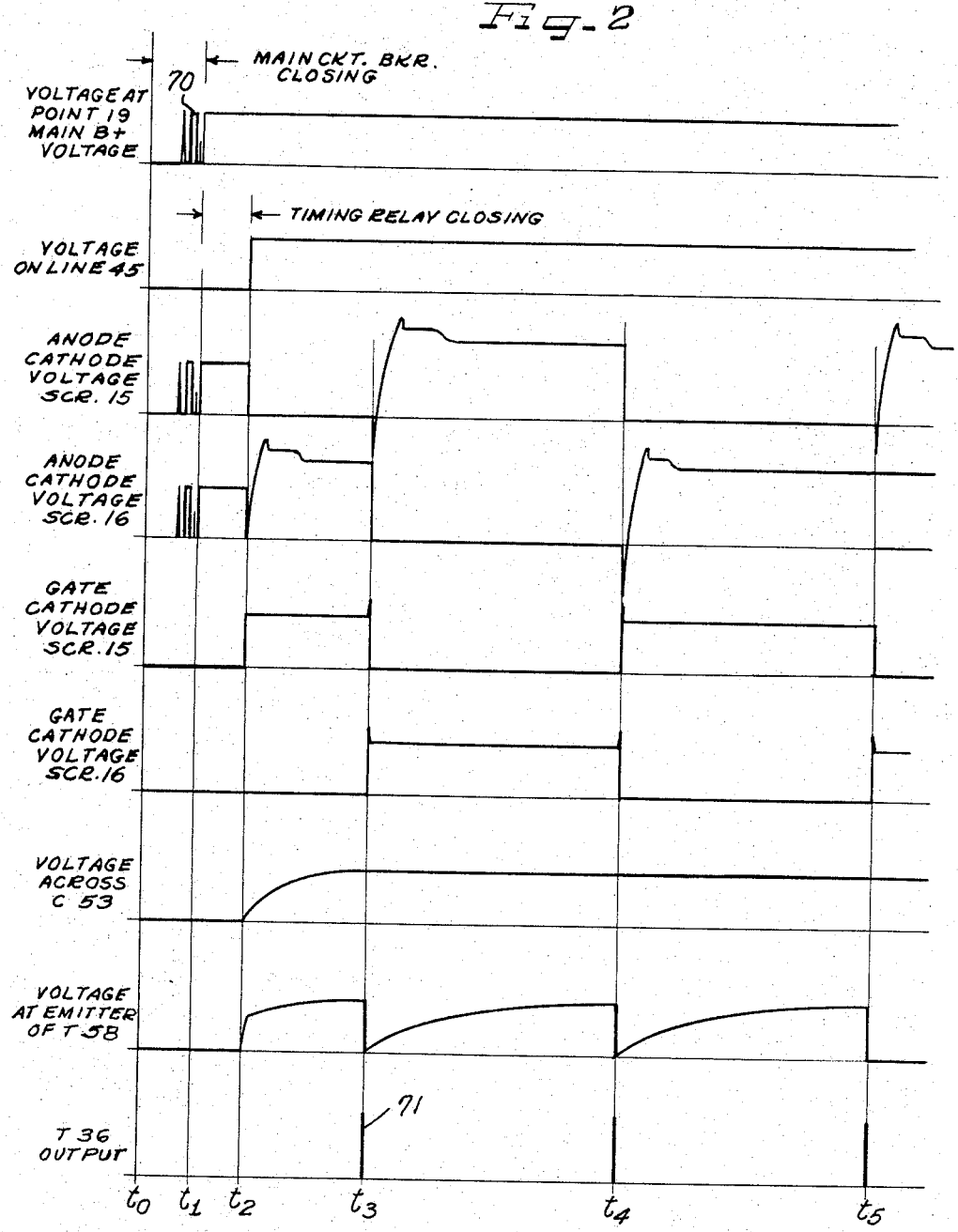

3,350,625
PULSE CONTROLLED INVERTER CIRCUIT
Arthur B. Larsen, Parma, Ohio, assignor to TRW Inc.,
a corporation of Ohio
Filed Oct. 28, 1963, Ser. No. 319,264
7 Claims. (Cl. 321—45)

This invention relates to an inverter for converting DC to AC and more particularly to an inverter using silicon controlled rectifiers which is simple in construction and operation and yet highly reliable and efficient.

The invention relates generally to inverters of the type using a pair of silicon controlled rectifiers having their anodes connected to the opposite ends of a center-tapped transformer primary winding with their cathodes connected through a direct current source to the center tap, the rectifiers being rendered alternately conductive to develop an AC current in a secondary winding of the transformer. Such inverters have been generally satisfactory but have been subject to certain limitations. In particular, it has been found that the operation of the rectifiers is sometimes erratic, especially when the load is reactive. It has been discovered that this difficulty arises from the application of a negative voltage to the anode of one of the rectifiers to turn it off prematurely.

According to an important feature of this invention a locking arrangement is used for applying a voltage to the gate of each rectifier in a manner such as to insure that each rectifier when conducting will not be switched off prematurely. With this feature, it is possible to use a simple and inexpensive gating control circuit such as, for example, a circuit using a unijunction transistor to develop short gating pulses, whereas it has heretofore been considered necessary to apply a square wave gating signal from a low impedance source to insure against premature turning off of the rectifiers.

Another important feature of the invention arises from the discovery that transformer saturation and the resultant overloading of rectifiers is apt to occur during starting of the inverter. In particular, it is found that a full half-cycle of voltage applied to a transformer may drive it into saturation, while the same transformer would perform satisfactorily under normal operating conditions. According to this feature, means are provided for obtaining a period of conduction of the rectifier initially rendered conductive upon starting, which is substantially less than the normal period of conduction, to avoid saturation of the transformer. With this feature, the circuit is extremely reliable in operation, and it is also possible to use a transformer of smaller size and weight.

Still another important feature of the invention is in the use of a time delay relay to delay conduction of the controlled rectifiers and to delay application of supply voltage to a triggering signal generating circuit for a certain time interval after closing of a main circuit breaker or switch, to prevent erratic operation which might otherwise result from voltage transients produced during closing of the breaker or switch.

Further important features of the invention reside in circuit arrangements for insuring against premature switching and for obtaining an initial conductive period of reduced duration, in a simple, reliable and efficient manner, using a minimum number of components.

This invention contemplates other objects, features and advantages which will become more fully apparent from the following detailed description taken in conjunction with the accompanying drawings which illustrate a preferred embodiment and in which:

FIGURE 1 is a schematic electrical diagram of an inverter circuit constructed in accordance with the principles of this invention; and FIGURE 2 is a graph illustrating voltage wave forms at various points of the circuit of FIGURE 1.

The inverter circuit of FIGURE 1, generally designated by reference numeral 10, is operated from a battery 11 to supply AC to a load 12 which is connected to a secondary winding 13 of an output transformer 14.

To develop the AC in the secondary winding 13, a pair of silicon controlled rectifiers 15 and 16 are rendered alternately conductive, the anodes thereof being connected to the ends of a primary winding 17 of the transformer 14. A center tap 18 of the primary winding 17 is connected to a circuit point 19 which is connected through a main switch 20 to the positive terminal of the battery 11. The cathodes of the rectifiers 15 and 16 are connected together and to a line 21 which is connected through a commutating inductor 22 to a line 23 connected to the negative terminal of the battery 11. A pair of diodes 25 and 26 are connected between the line 23 and taps 27 and 28 of the primary 17 in a manner such as to protect the rectifiers 15 and 16 from high reverse voltage spikes which might be encountered during transient periods or while supplying power to a reactive load. A commutating capacitor 30 is connected between the anodes of the rectifiers 15 and 16 and together with the inductor 22 serves to cause one rectifier to be turned off when the other is turned on.

To render the rectifiers 15 and 16 alternately conductive, the gates thereof are respectively connected through resistors 31 and 32 to the line 21 and through resistors 33a and 34a to one terminal of a secondary winding 35 of a pulse transformer 36, the other terminal of the winding 35 being connected to the line 21. Assuming, for example, that the rectifier 15 is conductive, the application of a pulse from the winding 35 will not immediately effect the rectifier 15 since it is already conductive, but will cause conduction of the rectifier 16, whereupon the rectifier 15 will be turned off through the action of the commutating inductor 22 and the commutating capacitor 30. The application of the next pulse from the winding 35 will then cause conduction of the rectifier 15 to switch the rectifier 16 off in the same manner. Thus the rectifiers 15 and 16 are rendered alternately conductive by application of repeated positive pulses from the winding 35.

According to an important feature of the invention, a holding circuit is provided for applying voltages to the gates of the rectifiers in a manner to prevent the rectifiers from being turned off prematurely. In particular, the gates of the rectifiers 15 and 16 are connected through a pair of conventional diodes 37 and 38 and a pair of Zener diodes 39 and 40 to circuit points 41 and 42 which are connected through resistors 43 and 44 to a line 45, line 45 being connected to circuit point 19 through a contact 46 of a time delay relay 47, the line 45 being thereby connected to the positive terminal of the battery 11, upon closing of the main switch 20 and thereafter the closing of the contact 46. Circuit points 41 and 42 are additionally connected to the anodes of the rectifiers 16 and 15, respectively, through diodes 49 and 50. Circuit point 42 is also connected through a diode 51 which is connected to the line 45 through a resistor 52 and which is connected to the line 23 through a capacitor 53.

In operation, the main switch 20 is closed to energize the relay 47 and after a certain time delay, the contact 46 is closed to thereby connect the positive terminal of the battery 11 to the line 45. The capacitor 53 initially has no voltage thereacross and through the diode 51 prevents the application of a positive voltage to the gate of the rectifier 16, so that the rectifier 16 will not initially conduct. A positive voltage is however applied to the gate of the rectifier 15 through the diodes 37 and 39 and the resistor 43 to cause rectifier 15 to conduct. The capacitor 53 then charges up through the resistor 52. However, a positive voltage is not applied to the gate of the rectifier 16, due to the connection of the circuit point 42 through the diode 50 to the anode of the rectifier 15, which is at a relatively low potential when the rectifier 15 is conducting. However, when a triggering pulse is applied from the secondary 35 of the pulse transformer 36, it will drive the gate of the rectifier 16 positive to an extent sufficient to trigger the rectifier 16, whereupon the rectifier 15 will be cut-off from the commutating action of the inductor 22 and the capacitor 30. Diode 49 then functions to prevent application of a voltage to the gate of the rectifier 15 sufficient to trigger the rectifier 15.

Accordingly, the rectifier 15 is initially rendered conductive and thereafter the rectifiers are alternately rendered conductive in response to triggering pulses applied from the secondary winding 35 of the pulse transformer 36. However, the rectifiers cannot be switched off prematurely even if the anode potentials thereof should momentarily drop below certain values, such as might happen under reactive load conditions, due to the fact that a positive voltage is applied to the gate of each rectifier while it is conducting. For example, when rectifier 15 is conductive, a positive voltage is applied through the diodes 37 and 39 and the resistor 43 and similarly, when the rectifier 16 is conductive, a positive voltage is applied to the gate thereof through the diodes 38 and 40 and the resitsor 44. Diodes 33 and 34 serve to prevent application of the positive locking voltages to the secondary 35 of the pulse transformer 36.

Zener diodes 39 and 40 serve to insure that the positive holding voltages will not be applied to the gates of the rectifiers 15 and 16 until the voltages between points 41 and 42 and the line 21 become substantially higher than the respective total voltage drops across the rectifiers 16 and 15 and the diodes 49 and 50.

Another important feature of the invention is in a triggering circuit for developing the triggering pulses in the secondary winding 35 of the pulse transformer 36, and in the operation thereof in a manner such as to obtain an initial period of conduction of the rectifier 15 which is substantially less than the normal period of conduction thereof, so as to prevent saturation of the output transformer 14.

As illustrated, the pulse transformer 36 has a primary winding 55 one terminal of which is connected to the line 23 and the other terminal of which is connected through a resistor 56 to the line 45 and also through a capacitor 57 to the emitter of a unijunction transistor 58. The first base electrode of the unijunction transistor 58 is connected to the line 23 while the second base electrode thereof is connected through a resistor 59 to a line 60 which is connected through a resistor 61 to the line 45. A Zener diode 62, operating as a voltage regulator, is connected between lines 23 and 60, while a filter capacitor 63 is also connected therebetween. The emitter of the transistor 58 is connected through a resistor 64 to the line 60 and is also connected through a diode 65 to a circuit point 66 connected to the line 23 through a resistor 67 and connected through a capacitor 68 and a resistor 69 to the line 60.

In operation, the closure of the main switch 20 energizes the time delay relay 47 and after a certain time delay, the contact 46 is closed and the rectifier 15 is rendered conductive in the manner as described above, conduction of the rectifier 16 being prevented through the operation of the diode 51 and capacitor 53, as described above. At the same time, a reset current is applied to the primary winding 55 of the pulse transformer 36 through the resistor 56. In addition, a regulated voltage is developed at the line 60, relative to the line 23. The capacitor 57 is then charged through two paths, one being through the resistor 64 and the other being through the diode 65, the capacitor 68 and the resistor 69, capacitor 68 being also charged through current flow through the second path.

When the capacitor 57 is charged to a certain extent, the triggering voltage of the unijunction transistor 58 will be reached, to develop a low impedance path between the emitter and the first base electrode thereof, whereupon the capacitor 57 will discharge through the primary winding 55 of the pulse transformer 36, a pulse being thereby developed in the secondary winding 35. The rectifier 16 will then be triggered into conduction and the rectifier 15 will be cut-off due to commutation of inductor 22 and capacitor 30. At the same time, the reset current will be applied to the primary winding 55 through the resistor 56 and also the capacitor 57 will start to recharge. The charging path of the capacitor 57 will then be through the resistor 64 only, however, since in the meantime, the capacitor 68 will have developed a charge sufficient to hold the potential of the anode of the diode 65 below that of its cathode. Thereafter, the circuit including resistor 67, capacitor 68 and resistor 69 will have no effect on the operation of the circuit.

With this arrangement, accordingly, the duration of the initial period of conduction of the rectifier 15 will be substantially reduced with respect to its normal period of conduction, and saturation of the transformer 14 will be prevented. Preferably, the initial period of conduction of rectifier 15 is approximately one half the normal period.

Another important feature of the invention is in the use of the time delay relay 47 to delay conduction of the rectifiers 15 and 16 and to delay application of voltage to the triggering signal generating circuit for a certain time interval. This is important in preventing erratic operation such as may occur due to voltage transients during closing of the main switch 20 and in positively providing uniform starting conditions for the timing circuits. This feature and the other features of the invention may be clarified by reference to FIGURE 2 which shows the voltage wave forms at various points of the circuit.

As shown in FIGURE 2, the main switch or circuit breaker contact 20 may be closed during an interval from a time $t_0$ to a time $t_1$, resulting in voltage transients at the point 19, as indicated by reference numeral 70, such transients being also applied through the primary 17 of the transformer to the anodes of the rectifiers 15 and 16. With the timing relay contact 46 being open, such voltage transients are not applied through the holding circuit components to the gates of the rectifiers 15 and 16, nor are they applied to the pulse transformer circuit.

During a time from $t_1$ to time $t_2$, after the voltage at circuit 19 is stabilized, the timing relay contact 46 closes, to apply a positive voltage to the gate of the rectifier 15 and to cause it to conduct in a manner as described above. The voltage of the anode of the rectifier 15 then drops to a very low value, while the voltage of the anode of the rectifier 16 rises to a value on the order of twice the supply of voltage. At the same time, a positive voltage is applied to the gate of the rectifier 15 to maintain it in a conductive state, which will not be effected by transient voltages or the like produced from reactive load conditions.

At time $t_2$ also, a voltage is applied to the triggering signal generating circuit and at a time $t_3$, a first positive pulse 71 is developed across a pulse transformer secondary 35, which triggers the rectifier 16 into a conductive state, thereby cutting off conduction of the rectifier 15. Thereafter, at time $t_4$, another positive pulse is developed at the pulse transformer secondary 35 to re-trigger rectifier 15 into conduction and to cut-off connection of the rectifier 16, and at a time $t_5$, still another positive pulse is developed to cause conduction of the rectifier 16 and to cut-off conduction of the rectifier 15.

The times $t_3$–$t_4$ and $t_4$–$t_5$ are the normal half-cycle periods, the time $t_3$–$t_5$ being the normal full cycle period. It will be noted that the time $t_2$–$t_3$, the initial period of conduction of the rectifier 15, is substantially less than the normal half-cycle period, which prevents saturation of the transformer as described above.

It may further be noted that the unijunction transistor oscillator is operated at a frequency equal to twice the output frequency. Thus, for a 60 cycle output, the unijunction transistor oscillator is operated at 120 cycles while for a 400 cycle output, the unijunction transistor oscillator is operated at 800 cycles.

It will be apparent that various modifications may be made. For example, thyratrons may be substituted for the silicon controlled rectifiers, with appropriate changes in circuit values, etc., and it will be understood that the term "controlled rectifiers" is used herein and in the claims includes thyratrons or other devices equivalent to silicon controlled rectifiers.

It will be understood that modifications and variations may be made without departing from the spirit and scope of the novel concepts of this invention.

I claim as my invention:

1. In an inverter circuit for converting DC to AC, a transformer including primary winding means, at least two controlled rectifiers each having a gate electrode, means for connecting said primary winding means to a DC source through said rectifiers, means for applying periodic triggering pulses to said gate electrodes to cause alternate conduction of said rectifiers, locking means for applying a voltage to said gate electrodes, and commutation means for rendering one of said rectifiers non-conductive and the other of said rectifiers conductive and for substantially simultaneously switching said locking voltage means from the gate of said one rectifier to the gate of said other rectifier.

2. In an inverter for converting DC to AC, a transformer including primary winding means, a pair of controlled rectifiers having gate electrodes, means connecting said primary winding means to a DC source through said controlled rectifiers to develop an alternating flux in said transformer in response to alternate conduction of said rectifiers, means for applying triggering pulses to said gate electrodes to cause conduction of said rectifiers, commutating means for rendering each rectifier non-conductive at a certain time after it is triggered into conduction, and locking means for applying a voltage to the gate electrode of each controlled rectifier to maintain it conductive until rendered non-conductive through the operation of said commutating means, said locking means being switched from the gate of a non-conducting rectifier to the gate of a conducting rectifier by said commutating means.

3. In an inverter for converting DC to AC, a transformer including primary winding means, at least one controlled rectifier having a gate electrode, means for connecting said primary winding means to a DC source through said rectifier, means for applying periodic triggering pulses to said gate electrode to cause conduction of said rectifier, commutating means for rendering said rectifier non-conductive, and locking means including an impedance having one terminal connected to said DC source and a second terminal coupled to said gate electrode to apply a holding voltage maintaining said rectifier conductive, and means including a diode coupling said second terminal to said commutating means for discontinuing application of said holding voltage upon operation of said commutating means.

4. In an inverter for converting DC to AC, a transformer including primary winding means, at least one controlled rectifier having a gate electrode, means for connecting said primary winding means to a DC source through said rectifier, means for applying periodic triggering pulses to said gate electrode to cause conduction of said rectifier, commutating means for rendering said rectifier non-conductive, an impedance having first and second terminals, means for connecting said first terminal to said gate electrode and arranged to produce a certain voltage drop, means for connecting said second terminal to said DC source to apply a voltage greater than said voltage drop and to apply a certain holding voltage to said gate electrode, and means coupling said first terminal to said commutating means to discontinue application of said holding voltage upon operation of said commutating means.

5. An inverter as defined in claim 4 wherein said means for connecting said first terminal to said gate electrode comprises a Zener diode for producing said certain voltage drop.

6. In an inverter for converting DC to AC, switch means for connection to a DC source, a transformer including primary winding means, a pair of controlled rectifiers having gate electrodes, means including said switch means connecting said rectifiers between said primary winding means and said DC source, commutating means for rendering each rectifier non-conductive upon conduction of the other, a triggering pulse source, means for applying pulses from said source to the gate electrodes of both of said rectifiers for rendering said rectifiers alternately conductive at a frequency equal to one-half the frequency of said pulses, and means operative following initial closure of said switch means for initially preventing conduction of one of said rectifiers and causing conduction of only the other of said rectifiers.

7. In an inverter for converting DC to AC, a transformer including primary winding means, a pair of controlled rectifiers having gate electrodes, means for connecting said primary winding means to a DC source through said rectifiers to develop an alternating flux in said transformer in response to alternate conduction of said rectifiers, oscillator means for applying triggering signals to said gate electrodes, commutating means for rendering each rectifier non-conductive for a certain time after it is triggered into conduction, a timing circuit associated with said oscillator means including a first capacitor, a first resistor in series with said first capacitor for charging said first capacitor at a certain rate, means for discharging said first capacitor to produce a triggering signal when the voltage thereacross reaches a certain value, and a series circuit including a second resistor, a diode and a second capacitor connected in parallel with said first resistor and operative upon initial application of supply voltage to said timing circuit for increasing the rate of charge of said first capacitor until said second capacitor is charged to a certain value.

References Cited

UNITED STATES PATENTS

| | | | |
|---|---|---|---|
| 2,445,681 | 7/1948 | Littwin | 321—37 |
| 2,549,807 | 4/1951 | Heed | 321—37 |
| 2,554,837 | 5/1951 | Meszaros | 321—37 |
| 2,626,378 | 1/1953 | Levy | 321—11 |
| 3,164,767 | 1/1965 | Morgan | 321—45 |
| 3,172,060 | 3/1965 | Jensen. | |
| 3,237,124 | 2/1966 | Wellford | 321—46 X |
| 3,243,686 | 3/1966 | Forster | 321—45 |
| 3,264,548 | 8/1966 | King | 321—45 |

JOHN F. COUCH, *Primary Examiner.*

W. SHOOP, *Assistant Examiner.*